(12) United States Patent
Brunner

(10) Patent No.: US 9,120,133 B2
(45) Date of Patent: Sep. 1, 2015

(54) GROUND WATER PURIFICATION PLANT BASED ON BIOLOGICAL OXIDATION AND REDUCTION PROCESSED

(75) Inventor: Willi Brunner, Wiesendangen (CH)

(73) Assignee: United Waters International AG, Zug (CH)

( * ) Notice: Subject to any disclaimer, the term of this patent is extended or adjusted under 35 U.S.C. 154(b) by 619 days.

(21) Appl. No.: 13/322,649

(22) PCT Filed: Jun. 1, 2010

(86) PCT No.: PCT/IB2010/052439
§ 371 (c)(1),
(2), (4) Date: Jun. 29, 2012

(87) PCT Pub. No.: WO2010/140116
PCT Pub. Date: Dec. 9, 2010

(65) Prior Publication Data
US 2012/0261336 A1    Oct. 18, 2012

(30) Foreign Application Priority Data

Jun. 2, 2009 (SE) ........................................ 0950397

(51) Int. Cl.
*C02F 3/06*    (2006.01)
*E03B 3/08*    (2006.01)
(Continued)

(52) U.S. Cl.
CPC . *B09C 1/002* (2013.01); *C02F 3/06* (2013.01); *E03B 3/08* (2013.01); *E03B 3/34* (2013.01); *C02F 3/04* (2013.01)

(58) Field of Classification Search
CPC ............. B09B 1/002; B09B 1/10; E03B 3/08; E03B 3/12; E03B 3/34; C02F 3/06; C02F 2103/06; B09C 1/002; B09C 1/10

USPC ................... 210/617, 747.1, 747.7, 150, 151, 210/170.01, 170.07; 405/128.45, 128.5, 405/128.7, 128.75, 129.2, 129.25
See application file for complete search history.

(56) References Cited

U.S. PATENT DOCUMENTS 2,352,832 A    6/1944    Gunderson
3,649,533 A    3/1972    Reijonen Yrjo et al.
(Continued)

FOREIGN PATENT DOCUMENTS

EP            0 260 244 A2    3/1988
FR            2 912 171 A1    8/2008
WO         2006/014126 A1    2/2006

OTHER PUBLICATIONS

International Search Report, corresponding to PCT/IB2010/052439, mailed on Nov. 24, 2010.
(Continued)

*Primary Examiner* — Christopher Upton
(74) *Attorney, Agent, or Firm* — Renner, Otto, Boisselle & Sklar, LLP

(57) ABSTRACT

The present invention relates to an artificial aquifer for decreasing the contents of metals, metalloids, nitrate, nitrite, pesticides and organic micro contaminants in natural ground water or artificial infiltrated groundwater from surface water. The system comprising a basin of filling material creating a reaction zone, a feeding line, one or more satellite wells, at least one main well and a pumping well, whereby the feeding line is applied in the upper outer periphery of the basin and wherein the main well is connected to a pumping well via a bottom outflow provided with a regulating valve to maintain a given level of water in the aquifer. The invention further relates to a method for purifying water.

15 Claims, 3 Drawing Sheets

(51) Int. Cl.
  *B09C 1/00* (2006.01)
  *E03B 3/34* (2006.01)
  *C02F 3/04* (2006.01)

(56) References Cited

U.S. PATENT DOCUMENTS

| | | | |
|---|---|---|---|
| 4,401,569 A * | 8/1983 | Jhaveri et al. | 210/170.07 |
| 4,576,717 A * | 3/1986 | Collin et al. | 210/747.7 |
| 4,919,568 A * | 4/1990 | Hurley | 210/170.09 |
| 5,006,250 A | 4/1991 | Roberts et al. | |
| 5,178,491 A * | 1/1993 | Graves et al. | 405/128.45 |
| 5,221,159 A | 6/1993 | Billings et al. | |
| 5,575,585 A * | 11/1996 | Kovarik | 210/747.7 |
| 5,833,855 A * | 11/1998 | Saunders | 210/747.7 |
| 6,116,816 A * | 9/2000 | Suthersan et al. | 210/170.07 |
| 6,382,237 B1 | 5/2002 | Takai | |
| 2006/0157423 A1* | 7/2006 | Cleary | 210/747 |

OTHER PUBLICATIONS

Written Opinion of the International Searching Authority, corresponding to PCT/IB2010/052439, mailed on Nov. 24, 2010.

* cited by examiner

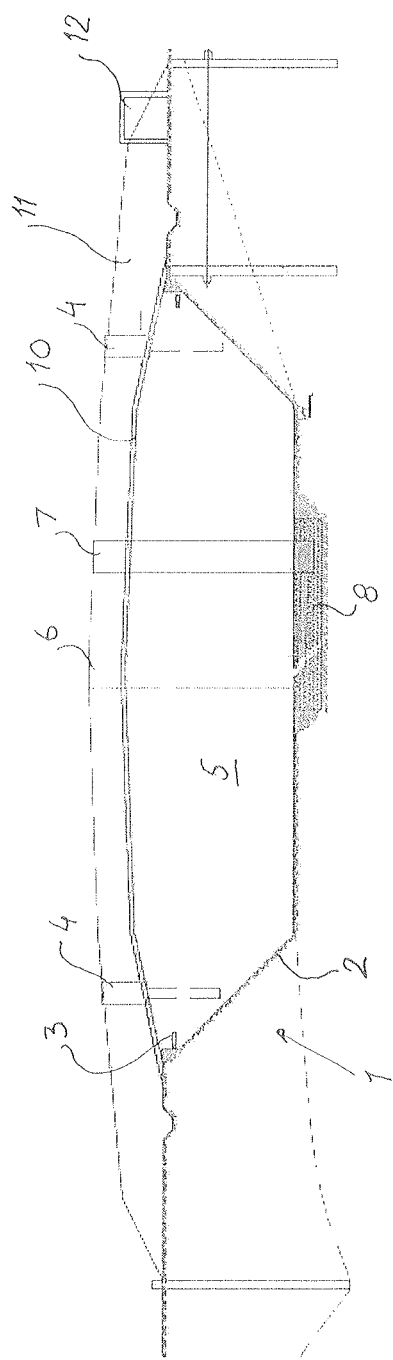

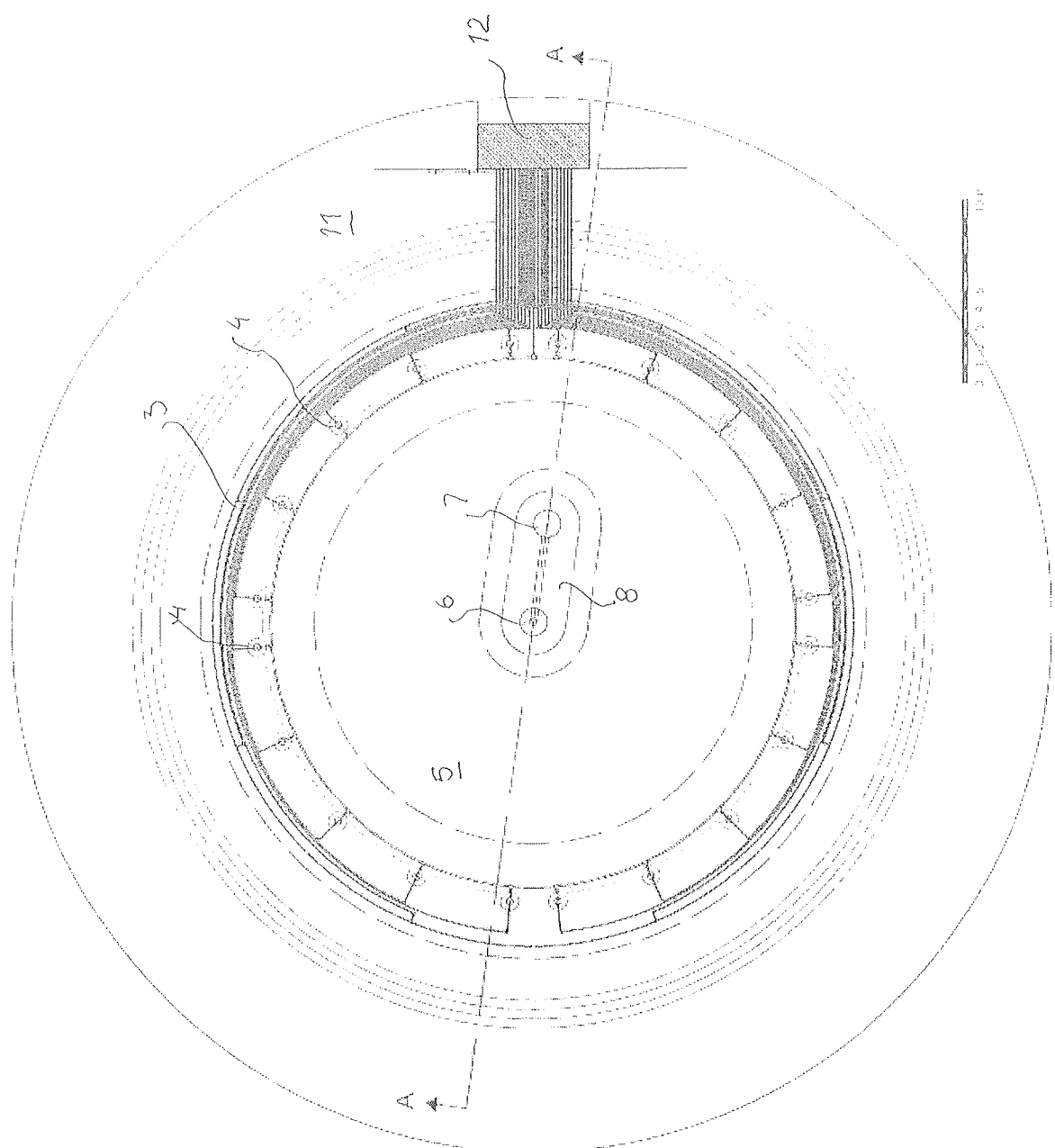

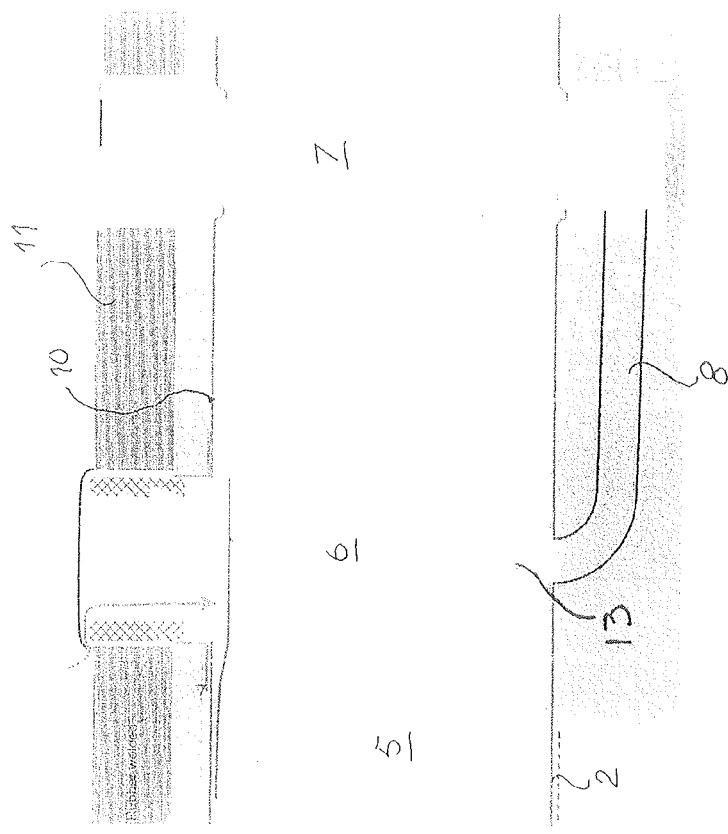

GROUND WATER PURIFICATION PLANT BASED ON BIOLOGICAL OXIDATION AND REDUCTION PROCESSED

FIELD OF THE INVENTION

The present invention relates to an artificial built aquifer for the purification of raw water, and in particular for creating at least one reaction zone in the artificial aquifer, for circulating and purifying ground and raw water, in particular for drinking water use, which artificial aquifer comprises several satellite wells and at least one extraction well.

BACKGROUND OF THE INVENTION AND PRIOR ART

Purification of water becomes more and more important due to contaminations obtained in ground water reservoirs, so called as natural aquifers.

Commonly, purification of water takes place by having water primarily reacted with different oxidation agents, then having it penetrated through specially arranged layers of gravel, sand and other materials, and then transporting the water thus purified via a pipeline system, optionally provided with pressure increasing pumping stations and/or water towers, to the consumer.

Ground water and raw water, which are used for drinking or tap water production often contain high amounts of iron, manganese, arsenic, fluoride and other trace elements. High levels of above mentioned trace elements have to be reduced before the water can be used for tap water (drinking purpose) due to health and taste reasons. EP-A-0 160 774 describes the use of a zone for oxidation and precipitation of iron and manganese where water containing oxygen or oxygen producing compounds intermittent are added to the zone via satellite wells arranged around extraction wells. Hereby water is fed only to a few satellite wells and simultaneously water is extracted from adjacently situated satellite wells. The water enriched with oxygen and free of any air bubbles is forced down the satellite wells. The addition of dissolved Oxygen creates a suitable growth environment for microorganisms present in the ground, which microorganisms together with chemical and/or biochemical processes provide for precipitation of iron and manganese in the zone/ground layer, which will serve as a reactive filter for the removal of arsenic, fluoride and other trace elements. Iron oxidizing bacteria assists in the oxidation of ferrous iron of the untreated water. This action is repeated at specific intervals to obtain pure water. However, it is not only iron and manganese that are a problem but other metals, metalloids, nitrate, nitrite, pesticides and organic sourced micro contaminants need to be eliminated to produce a healthy water, particularly when considering tap water quality.

In earlier patent (U.S. Pat. No. 475,304) another method to improve the above process was used, which included working with three so called mainwells which were placed with linear distances of 600 meter to 1000 meter from each well. Groundwater was pumped up from one well and part of this water was enriched with oxygen and recharghed into the other two wells. The circular arrangement of oxygenated water around the recharghed wells allowed to withdraw a limited amount of purified water before again a recharge had to occur. This system showed several disadvantages in the operation, energy consumption and removing of other trace elements than Iron. Further on this was not an artificial aquifer but was built in the natural aquifer.

EP-A-0 154 105 describes reduction of nitrate in ground water by means of denitrification in a reduction zone created between injection/satellite wells also arranged around one or more extraction wells.

According to the method and system as disclosed in EP-A-0 154 105, a different method of creating oxidation and reduction zones was perceived, and achieved. An oxygen enrichment system is placed above ground in the satellite wells to cover, thus oxygenating the pumped up water before flowing back into the satellite wells. In these wells a separator was present in each well which divided the well into an upper and a lower part Inflow of compressed air is achieved through a first pipe into the upper half of the well, and through a second pipe into the lower half of the well. Water may be pumped from the upper half of the well for a certain time duration after which it may be pumped from the lower half of the well for the remaining time duration. In the disclosure the feeding of water is restricted to some wells to create a denitrification zone. Thereby all the aquifer is not used for denitrification purpose.

It is previously known to create reaction zones in aquifers to obtain an oxidation and a precipitation zone or a reduction zone between a number of injection or satellite wells arranged around one or more extraction wells in such reaction zones, whereby the zone desired is created intermittently or continuously between each pair of adjacent situated injection wells by introducing oxygen, oxygen containing gas or oxygen releasing compounds in the water of the two injection wells when one creates an oxidation and precipitation zone, or introduce an oxygen consuming compound in the injection wells to obtain a reduction zone, and whereby one pumps the water of one of the satellite wells into the neighbouring satellite well so that a circulation circuit is created in the aquifer between the two satellite wells.

However, in certain areas of the globe the natural layers have been destroyed by contaminants or there is a lack of natural uniform layers with suitable material compositions. For that reason artificial aquifers have been proposed, whereby the artificial aquifer consists of a basin, normally covered with an impermeable cloth or sheet to provide a defined volume. The basin is then filled with gravel and sand, and is provided with tubings and wells to a) add ground water or any other raw water to the basin, b) create the demanded reactive zone for the precipitation and c) to remove the water having been treated in the basin.

The present invention is based on the known in situ process with the name Vyredox or Nitredox. The artificially built plant will be operated under the same conditions as created in the natural in situ plants. The bottom of the present plant is tightened up with a impermeable membrane to isolate the plant from the natural ground aquifer and to provide for the possibility to use special natural derived washed or unwashed filling materials to create ideal conditions for the spread out of the activated reactive zone as quick as possible as well as to maintain the appropriate flow and hydrological conditions.

EP 1 436 469 related to a certain construction of satellite well pipes, also discloses the use of artificial aquifers, wherein the supply tubing is placed midway down in the reaction zone of gravel and sand To overcome the problems arising due to clogging of toe earlier embodiments, system as discussed in patent EP 1 436 469 and method was derived. Pressure inlet pipes were introduced in the upper half as well as the lower half of the wells. The upper half and lower half were defined by introduction of a balloon body which acted as a separator. Conduits supported the pressure inlet pipes, in each half. A circulation vessel was provided, above the ground, over each well. Initially, air/water was supplied to the upper half of the well and water was pumped upwardly into the circulation vessel for being de-aerated. The water flowed then by gravity into the lower half of the well, below the balloon body. This procedure was carried out for a certain time duration in one or more satellite wells. In another satellite well, or for the remaining time duration, air was pressurized into the lower half of the well, below the balloon body. The upflow of water was directed into the aeration and de-bubbling vessel. This de-bubbled water flows back into the top half of the well, before it passes out of through the well screen, into the ground.

WO 2006/014126 discloses another artificial aquifer working under a negative pressure and therefore using a complete water and air tight enclosure. Also in this case the supply tubing is placed midway down in the aquifer and the satellite wells are special designed.

Further enhancements in WO 2006/014126 patent application, included placing a plurality of satellite wells in a circular or rectangular way, as well as one extraction well in their centre. The infiltration system was arranged close to the satellite wells. An oxygen enrichment system was placed above ground. These wells and infiltration system were placed in artificial aquifers developed by placing filter material to define a manmade basin of the aquifer, beneath the ground. There was a need to hermetically seal all these wells and all covering. Due to this specific assembly, dead zones were created at the sides of the artificial aquifer. The dead-zones were created due to non-circulation of water in those zones. In its typical working, water entered the satellite wells through its permeable screens, before being directed out to the oxygen enrichment system. Oxygenated water re-enters the satellite wells and therefore the whole of the aquifer. The main flow of water is thus established, that purified water enters the extraction well, in the centre, and can be pumped out, for use. The hermetic sealing of the aquifer is needed for the proposed operation under negative pressure. The inhomogeneity between the activated zones and the dead zones provides severe issues. Working under negative pressure is very energy consuming and requires a very high technological sealing to be acquired. Thus it is high energy and cost requiring.

Thus in these known constructions, dead zones will be created, in particular over the supply tubing, which dead zones will disturb the activity in the reaction zone, as the environmental differences between the dead zones and the reaction zone are too great.

A further problem solved is to maintain the growth environment of the microorganisms carrying out the purification of the water in the aquifer. Thus the aquifer may not be dried out, i.e., emptied completely, changing the hydrology around the microorganisms.

SUMMARY OF THE INVENTION

The present invention relates to an artificial aquifer having eliminated dead zones. The present invention thus relates to a method for decreasing the contents of metals, metalloids, nitrate, nitrite, pesticides and organic micro contaminants in natural ground water, artificial infiltrated ground water from surface water according to the appending claims. In a further aspect the present invention relates to an apparatus for carrying out the method.

According to this invention, there is provided an artificial aquifer for decreasing the contents of metals, metalloids, nitrate, nitrite, pesticides and organic micro contaminants in natural groundwater, artificial infiltrated ground water from surface water, and comprising a basin of filling material creating a reaction zone, a feeding line, one or more satellite wells, at least one main well and a pumping well, characterized in that the feeding line is applied in the upper outer periphery of the basin, and wherein the main well is connected to a pumping well via a bottom outflow provided with a regulating valve to maintain a given level of water in the aquifer.

Typically, the satellite wells may be arranged in a circular pattern inside the feeding line.

Typically, the feeding line may be placed at a distance from the outer periphery of the basin that is less than $1/40^{th}$ of the diameter of the aquifer, preferably less than $1/50^{th}$ of the diameter, preferably less than $1/60^{th}$ of the diameter, and more preferably less than $1/100^{th}$ of the diameter Typically, the bottom of said basin may be covered with an impermeable sheet to reduce loss of water from the basin.

Typically, said basin is filled with natural, washed or unwashed material which is commonly used for the purification of ground water.

Typically, said satellite wells are arranged vertical into the material used for filling said basin.

Typically, said feeding line may consist of a perforated tube through which the water to be processed is fed and pressed out into the reaction zone.

Typically, said main well is a vertical main well, which vertical main well being located substantially in the middle of said aquifer.

Typically, said main well is a vertical main well, which vertical main well consisting of a perforated tube holding the filling material of the aquifer out, but allowing water to penetrate into the well.

Typically, an outflow tubing is provided for establishing communication between said main well and said pumping well, for pumping water out of said main well.

Typically, a non-closing lid covers the top of said main well.

Typically, an impermeable geomembrane may be applied as a cover on top of said aquifer.

Typically, a process control unit is connected for controlling the feeding in of water in said aquifer.

Typically, a process control unit is connected for controlling the feeding out of water from said main well.

According to this invention, there is provided a method for decreasing the contents of metals, metalloids, nitrate, nitrite, fluoride, pesticides and organic micro contaminants in natural ground water, or artificially infiltrated ground water from surface water using an artificial aquifer, whereby the water to be processed is infiltrated into a basin of filling material creating a reaction zone through a feeding line, processed in one or more satellite wells, and passed to at least one main well and a pumping well, whereby the feeding line is applied in the upper outer periphery of the basin thereby avoiding so called dead zones in the aquifer and providing for a higher degree of purification and whereby water having been purified is withdrawn from the aquifer via the main well which is connected to a pumping well via a bottom outflow provided with a regulating valve to maintain a given level of water in the aquifer.

Typically, the main well is brought in contact with the surrounding atmosphere thereby avoiding any negative pressure in the aquifer.

Typically, water is flushed out from said satellite wells into said reaction zone in a circular pattern to allow the reaction zone to recover intermittently and to create a balanced working pressure on the microorganisms acting in said zone.

DETAILED DESCRIPTION OF THE INVENTION

In particular the present invention relates to an artificial aquifer for decreasing the contents of metals, metalloids, nitrate, nitrite, pesticides and organic micro contaminants in natural ground water, artificial infiltrated ground water from surface water, and comprising a basin of filling material creating a reaction zone, a feeding line, one or more satellite wells, at least one main well and a pumping well, characterized in that the feeding line is applied in the upper outer periphery of the basin and wherein the main well is connected to a pumping well via a bottom outflow provided with a regulating valve to maintain a given level of water in the aquifer.

The satellite wells may be arranged preferably in a circular pattern inside the feeding line.

Typically, raw untreated water or untreated natural groundwater is now injected into the plant, through its periphery, thus creating a circular pool of water, in line with the circular arrangement of the satellite wells of the plant, in the aquifer. Also, a number of satellite wells are used, to keep the reaction zone in a habitable form for optimal environmental living conditions for the relevant microorganisms.

A further aspect of the invention relates to a method for decreasing the contents of metals, metalloids, nitrate, nitrite, pesticides and organic micro contaminants in natural ground water, or artificial infiltrated ground water from surface water using an artificial aquifer, whereby the water to be processed is infiltrated into a basin of filling material creating a reaction zone, through a feeding line, processed in one or more satellite wells, and passed to at least one main well and a pumping well, whereby the feeding line is applied in the upper outer periphery of the basin thereby avoiding so called dead zones in the aquifer and providing for a higher degree of purification and whereby water having been purified is withdrawn from the aquifer via the main well which is connected to a pumping well via a bottom outflow provided with a regulating valve to maintain a given level of water in the aquifer.

The main well may be brought in contact with the surrounding atmosphere thereby avoiding any negative pressure in the aquifer.

The present invention will be described more in detail in the following with reference to the attached drawing showing a preferred embodiment of the invention, wherein FIG. 1 shows a cross-sectional view of an aquifer of the invention, FIG. 2 shows a view from above of the aquifer according to FIG. 1, and FIG. 3 shows a detail of the main well and the pumping well.

Thus the present invention relates to an artificially created basin completely filled with natural washed or unwashed material which is used for the purification of ground water. The purification results in a decrease of the content of metals, metalloids, nitrate, nitrite, pesticides and organic sourced micro contaminations. For the purification process raw ground water is fed into the basin through a peripheral infiltration line. The raw ground water passes on this way to the main well, the so called reactive zone, whereby oxygen, oxygen-releasing substances or natural organic substances will be present. This reactive zone provides the optimal environment for chemical and metabolic reactions by the naturally occurring microorganisms. The optimal environment in the reactive zone is maintained with the operation of the satellite wells. The outflow of the purified water from the main well at the bottom to the pumping well allows to keep the aquifer always full with water; named as an "artificial confined aquifer" and no negative pressure is ever present around the main well. The invention relates to an apparatus for carrying out the method under confined aquifer conditions and several satellite wells and the combination of at least one main well and for at least one pumping well.

The aquifer of the present invention consists of a basin 1, which is normally dug into the ground, and here having a circular design seen from above, and forming a truncated cone seen in a cross-section thereof. The bottom of the basin is covered with an impermeable sheet 2 to reduce loss of water from the basin. A circular infiltration line 3 serving as a feeding line, is arranged in close vicinity to the outer and upper periphery of the basin 1. The basin 1 is filled with natural, washed or unwashed material which is commonly used for the purification of ground water. Such material is normally sand and gravel and forms the reaction zone 5 of the aquifer. On the inside of the feeding tube line 3 satellite wells 4 forming a circular pattern are arranged at a substantially equal distance from each other. The satellite wells 4 are arranged vertical into the material. The feeding line 3 consists of a perforated tube through which the water to be processed is fed and pressed out into the reaction zone.

In the middle of the aquifer a vertical main well 6 is arranged, which well 6 consists of perforated tube holding the filling material of the aquifer out, but allowing water to penetrate into the well. The main well is emptied via a pumping well 7 which communicates with the main well 6 via an outflow tubing 8 (seen in FIG. 3). The opening of the bottom outlet of the main well 6 to the pumping well 7 is controlled by a regulating valve 13 accordingly to maintain always a high level of water in the aquifer to optimize the growth conditions of the microorganisms. The top of the main well 6 is covered with a non-closing lid 9, which allows the surrounding atmospheric pressure to act on the water level in the main well 6, thereby avoiding any negative pressure in the system.

In the pumping well 7 one or more pumps (not shown) are arranged to feed a transporting line (not shown) connected to the consumers, housings, industry facilities etc.

On the top of the aquifer an impermeable geomembrane 10 is applied or other cover in order to avoid contaminations from above into the reaction zone of filling materials. Any such contaminations may seriously disturb the activity in the reaction zone if they should contain compounds that afflict the growth of the microorganism flora used to reduce or oxidize the products to get rid off. A layer 11 of soil, gravel or sand is then applied on top of the geomembrane 10 to keep that in place.

A process control unit (PCU) 12 is connected to the system to control the feeding in and out of water, the introduction of water from the satellite wells 4 into the reaction zone by one or more nearby satellite wells in a controlled manner. Normally the introduction is carried out in a circular pattern to allow the reaction zone to recover intermittently and to create a balanced working pressure on the microorganisms acting in the said zone. The PCU 12 further controls the outflow of water from the main well 6 via the pumping well 7 to the distribution line. It should be understood that the PCU 12 is placed in contact with the ground or raw ground water supply.

The artificial aquifer shown in the drawing may contain a volume of more than 5000 cubic meters having a radius of more than 30 meters and a depth of 8 meters or more. Such an aquifer will last for many years and serve the population and industry around. The capacity of the aquifer per 24 his is calculated to about 2500 cubic meter of pure water based on a normally used particle size of the filling material. The capacity is calculated to last for 100 years.

Depending on the diameter of the artificial aquifer, which may vary from 5 to 7 meters up to 50 meters in diameter or more the capacity will range from 100 m$^3$-5000 m$^3$/day More than one raw water well (withdrawing the raw water from the aquifer/aquifers) can be used to withdraw the water from the natural aquifer/aquifers and supplying the water into the feeding line into the artificial aquifer.

More than one main well and pumping well (production well) can be used to pump up the purified water from the artificial aquifer.

The raw ground water passes on this way to the main well 6, the so called reactive zone 5 whereby oxygen, oxygen-releasing substances or natural organic substances will be present therein. This reactive zone provides the optimal environment for chemical and metabolic reactions by the naturally occurring microorganisms. The optimal environment in the reactive zone is maintained with the operation of the satellite wells 4. The outflow of the purified water from the main well at the bottom thereof to the pumping well allows to keep the artificial aquifer always full with water; named as an "artificial confined aquifer" and no negative pressure is ever present around the main well.

The operation of the plant is that, that raw untreated natural groundwater or artificially infiltrated ground water from surface water is infiltrated into the plant through the horizontally arranged tubing just in the periphery of the plant to avoid zones of non moving water (so called dead zones). The tubing is here arranged at a distance of less than 1 meter from the very outer periphery in an aquifer having a diameter of 35 to 40 meters. In case the artificial aquifer has a smaller diameter the tubing will be closer than 1 meter from the periphery, such as 0.5 meter or less to avoid any dead volume in the aquifer In a second inner parallel arrangement a number of satellite wells will be placed which are used to create the optimal environmental living conditions for the relevant microorganisms. In the center of the plant is the main well situated which is used as a collecting well and without the use of any pump the water is directed to the adjacent pumping well 7 by the opening at the bottom of the main well. This enable the operator to maintain the aquifer in a confined status and no negative pressure will ever occur and due to this all material within the aquifer is full soaked in water. The opening of the bottom outlet to the pumping well 7 is controlled by a regulating valve accordingly to maintain always a high level in the aquifer. The main level is covered by an impermeable geomembrane or other material and the top of the well is open to atmospheric changes and therefore the aquifer is not completely tight. For the removal of particles, such as in dusty areas an airfilter can be placed in the top construction of the main well. The pumping well is equipped with a pump and a level control device.

Thus the feeding line 3 is placed at a distance from the outer periphery that is less than $1/40^{th}$ of the diameter of the aquifer, preferably less than $1/50^{th}$ of the diameter, preferably less than $1/60^{th}$ of the diameter, and more preferably less than $1/100^{th}$ of the diameter.

The main claims of this invention is that the plant is operating avoiding any so called dead zones, does not need a hermetically sealing on the top due to controlled outflow which keeps the aquifer always as a confined aquifer in operation and that we will not apply any negative pressure around the main well. The arrangement of the aquifer can be in any form.

The design of the artificial aquifer above has been shown as a circular basin, while it is apparent that any form can be used, sometimes the form is predicted by the natural surroundings and what they will allow. Thus the artificial aquifer may be circular, oval, hexagonal, octagonal, or take any form dictated by the surrounding terrain.

Advantages:

1. No negative pressure means: The system disclosed in accordance with the current invention does not have any drawdown of water which provides a better use of the filling material and a lower and more constant entrance velocity of the water into the main well which reduces the risks of blocking the main well with small grains, drastically.

2. No dead zones means. The system disclosed in accordance with the current invention does not have zones where water is always standing and uncontrolled bacterial growth can happen which would destroy the water quality.

3. No hermetic closing is needed to avoid negative pressure around the main well.

4. The use of a main well together with a so called pumping well, in accordance with the system disclosed in the current invention secures during the operational time of the artificial aquifer, always the same water velocity and therefore, a much better performance in terms of filtration and general cleaning effects.

The invention claimed is:

1. An artificial aquifer for decreasing the contents of metals, metalloids, nitrate, nitrite, pesticides and organic micro contaminants in natural groundwater or artificial infiltrated ground water from surface water, and comprising:
    a basin of filling material creating a reaction zone,
    a feeding line,
    one or more satellite wells for flushing water into the reaction zone,
    at least one main well, and
    at least one pumping well,
    wherein the feeding line consists of a perforated tube applied in an upper outer periphery of the basin through which the water to be processed is fed and permeates through into the reaction zone, and
    wherein the main well is connected to a pumping well via a bottom outflow provided with a regulating valve to maintain a given level of water in the aquifer.

2. An artificial aquifer according to claim 1, wherein the artificial aquifer has a shape selected from a group of shapes consisting of circular, oval, hexagonal, octagonal, and a shape dictated by the surrounding terrain.

3. An artificial aquifer according to claim 1, wherein the satellite wells are arranged in a circular pattern inside the feeding line.

4. An artificial aquifer according to claim 1, wherein the feeding line is placed at a distance from the outer periphery of the basin that is less than $1/40^{th}$ of the diameter of the aquifer.

5. An artificial aquifer according to claim 1, wherein the bottom of said basin is covered with an impermeable sheet to reduce loss of water from the basin.

6. An artificial aquifer according to claim 1, wherein said basin is filled with natural, washed or unwashed material for the purification of ground water.

7. An artificial aquifer according to claim 1, wherein said main well is a vertical main well, which vertical main well comprising a perforated tube holding the filling material of the aquifer out, but allowing water to penetrate into the well.

8. An artificial aquifer according to claim 1, wherein an airtight lid is provided at top of said main well.

9. An artificial aquifer according to claim 1, wherein an impermeable geomembrane is applied as a cover on top of said aquifer.

10. An artificial aquifer according to claim 1, wherein the feeding line is placed at a distance from the outer periphery of the basin that is less than $\frac{1}{50}^{th}$ of the diameter of the aquifer.

11. An artificial aquifer according to claim 1, wherein the feeding line is placed at a distance from the outer periphery of the basin that is less than $\frac{1}{60}^{th}$ of the diameter of the aquifer.

12. An artificial aquifer according to claim 1, wherein the feeding line is placed at a distance from the outer periphery of the basin that is less than $\frac{1}{100}^{th}$ of the diameter of the aquifer.

13. A method for decreasing the contents of metals, metalloids, nitrate, nitrite, fluoride, pesticides and organic micro contaminants in natural ground water, or artificial infiltrated ground water from surface water using an artificial aquifer, whereby the water to be processed is infiltrated into a basin of filling material creating a reaction zone through a perforated feeding line, flushed into the reaction zone by one or more satellite wells, and passed to at least one main well and a pumping well, whereby the perforated feeding line is applied in the upper outer periphery of the basin thereby providing for a higher degree of purification and whereby water having been purified is withdrawn from the aquifer via the main well which is connected to a pumping well via a bottom outflow provided with a regulating valve to maintain a given level of water in the aquifer.

14. A method according to claim 13, wherein the main well is brought in contact with the surrounding atmosphere thereby avoiding any negative pressure in the aquifer.

15. A method as claimed in claim 13, wherein water is flushed out from said satellite wells into said reaction zone in a circular pattern to allow the reaction zone to recover intermittently and to create a balanced working pressure on the microorganisms acting in said zone.

* * * * *